United States Patent [19]
Lyons

[11] Patent Number: 5,851,064
[45] Date of Patent: Dec. 22, 1998

[54] INTEGRATED WARNING LIGHT AND REAR-VIEW MIRROR

[75] Inventor: Harold W. Lyons, Killingworth, Conn.

[73] Assignee: Whelen Engineering Company, Inc., Chester, Conn.

[21] Appl. No.: 743,993

[22] Filed: Nov. 5, 1996

Related U.S. Application Data

[62] Division of Ser. No. 556,735, Nov. 7, 1995, Pat. No. 5,660,457.

[51] Int. Cl.$^6$ ..................................................... B60Q 1/26
[52] U.S. Cl. ............................ 362/494; 362/542; 340/472
[58] Field of Search .......................... 362/83.1, 80, 83.3, 362/61, 223, 219; 340/471, 472, 473, 468, 469; 359/871, 872, 873, 874

[56] References Cited

U.S. PATENT DOCUMENTS

| | | |
|---|---|---|
| 1,602,094 | 10/1926 | Badding . |
| 1,874,027 | 8/1932 | Condon . |
| 2,010,138 | 8/1935 | Condon . |
| 4,620,268 | 10/1986 | Ferenc . |
| 4,866,329 | 9/1989 | Ferenc . |
| 5,016,996 | 5/1991 | Ueno . |
| 5,017,903 | 5/1991 | Krippelz, Sr. . |
| 5,212,468 | 5/1993 | Adell . |
| 5,253,115 | 10/1993 | Ueno . |
| 5,477,391 | 12/1995 | Boddy . |
| 5,499,169 | 3/1996 | Chen . |

Primary Examiner—Thomas M. Sember
Attorney, Agent, or Firm—Alix, Yale & Ristas, LLP

[57] ABSTRACT

A warning light is integrated with a fixed position, externally mounted rear-view mirror, the warning light having a housing which forms an aerodynamically contoured extension of the mirror. A light head is received by the housing such that, when the housing is engaged by the rear-view mirror, the light head assembly means generally faces towards the front of the vehicle.

3 Claims, 3 Drawing Sheets

INTEGRATED WARNING LIGHT AND REAR-VIEW MIRROR

This application is a divisional of application Ser. No. 08/556,735 filed Nov. 7, 1995 now U.S. Pat. No. 5,660,457.

BACKGROUND OF THE INVENTION

1. Field of the Invention

The present invention relates to warning light systems and, more particularly, to warning light assemblies for external installation on vehicles, especially emergency vehicles and other public service vehicles. Accordingly, the general objects of the present invention are to provide novel and improved apparatus of such character.

2. Description of the Prior Art

Lighting systems for mounting on the exterior of police and other public service vehicles have long been known in the art. The most popular form of exterior lighting for emergency vehicles is the light bar. A typical light bar assembly, as exemplified by the disclosure of Pat. No. 4,620,268, has a plurality of lights arranged on a beam which spans, but is spaced slightly above, the roof of a vehicle and which may be clamped to the vehicle rain gutters. Light bars are desirable because of their ability to provide a wide variety of highly visible light radiation patterns. However, regardless of whether a light bar is energized, its relatively large size and location on the roof of the vehicle makes it rather conspicuous. Thus, in circumstances where emergency vehicles, such as police cars, need to be inconspicuous, the use of light bars Is generally undesirable.

With the increased concern for highway safety of recent years, both state and local police departments have increasingly relied on the use of "unmarked" police cruisers to improve the efficiency of law enforcement efforts. Such "unmarked" police cruisers need warning lights which are as inconspicuous as possible until energized and, when energized, produce a highly visible display. As discussed herein, a highly visible display is one which produces wide angle illumination and, particularly, illumination having a pattern which will minimize the possibility of a collision at an intersection.

The warning lights used on "unmarked" police cars have previously taken a variety of forms. These lights have included the "portable" rotating beacon or strobe light, which will typically be transported within the interior of the vehicle at least until use is required, lights mounted behind the front grille of a vehicle and special headlight/taillight assemblies which may include flash tubes. While these prior art inconspicuous lights have all found acceptance in the law enforcement community, the users thereof have expressed a desire for enhanced visibility at large angles relative to the direction of vehicle travel. Thus, there exists a need for an emergency vehicle light configuration which is both (1) relatively inconspicuous when the lights are not illuminated; and (2) highly conspicuous after the lights have been illuminated, particularly from the side of the vehicle on which installed.

SUMMARY OF THE INVENTION

The present invention provides a novel and improved warning light assemblies for external mounting on a vehicle. In accordance with a preferred embodiment of the present invention, a warning light assembly consists of a light head, with a wide angle radiation pattern, which is configured for integration into a rear-view mirror assembly of the type which is permanently mounted on the exterior of the side of a vehicle. In most applications, the present invention can be incorporated into a rear-view mirror assembly simply by (1) removing the color coordinating trim from the forwardly facing side of the housing of a rear-view mirror assembly; (2) mounting the light head assembly to the housing of the rear-view assembly; and (3) supplying electricity to the light head. When the warning light assembly is integrated with an exterior mirror as described above, the emitted light will be projected forwardly with respect to the vehicle and use of the mirror contained within the existing rear-view mirror assembly is uninhibited. In the typical installation, a pair of warning lights in accordance with the invention will be mounted to the external rear-view mirrors on both sides of the vehicle. Thus, the present invention provides emergency warning lights which are highly conspicuous when illuminated, but are discreetly Incorporated into rear-view mirror assemblies for concealing the identity of the emergency vehicles when not illuminated.

In accordance with the present invention, the novel light head assembly includes a housing contoured so as to define an aerodynamically shaped extension of a vehicle side mirror housing. Typically, external rear-view mirrors are mounted on or adjacent to the leading edges of the front doors of the vehicle at window height. Since this location places the warning lights approximately at the eye level of other drivers, light projected from the light head assembly is readily visible by other drivers. Furthermore, the conspicuity of a warning light in accordance with the preferred embodiment of the invention is enhanced through the use of an Intense, wide angle light source as the light head. Finally, the pairing of the warning light assemblies of the invention results in a composite light dispersion pattern which covers a wide area in front of and on both sides of the vehicle.

BRIEF DESCRIPTION OF THE DRAWINGS

The present invention may be better understood and its various objects and advantages will become obvious to those skilled in the art by reference to the accompanying drawings wherein like numerals represent like elements in the several figures and in which.

DETAILED DESCRIPTION OF THE PREFERRED EMBODIMENT

Figure 1:
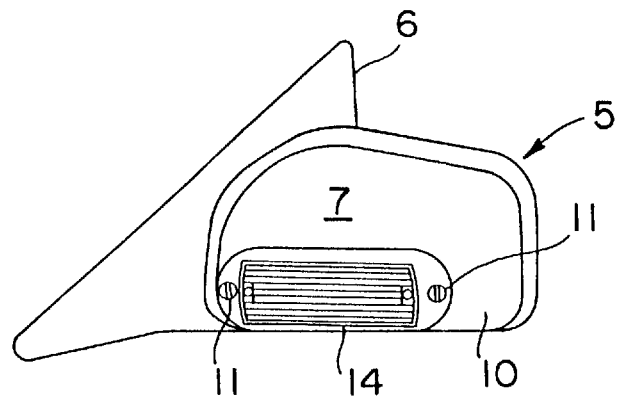
FIG. 1 is perspective view of a warning light/mirror assembly in accordance with the present invention.
Figure 2:
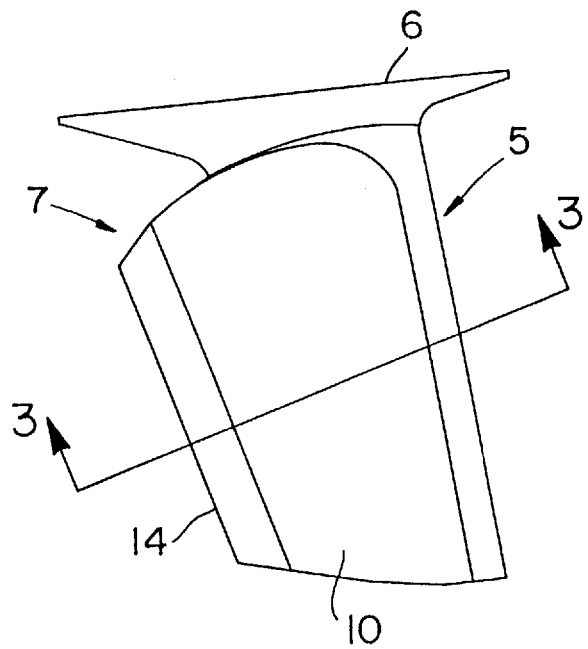
FIG. 2 is a top view of the apparatus shown in FIG. 1.
Figure 3:
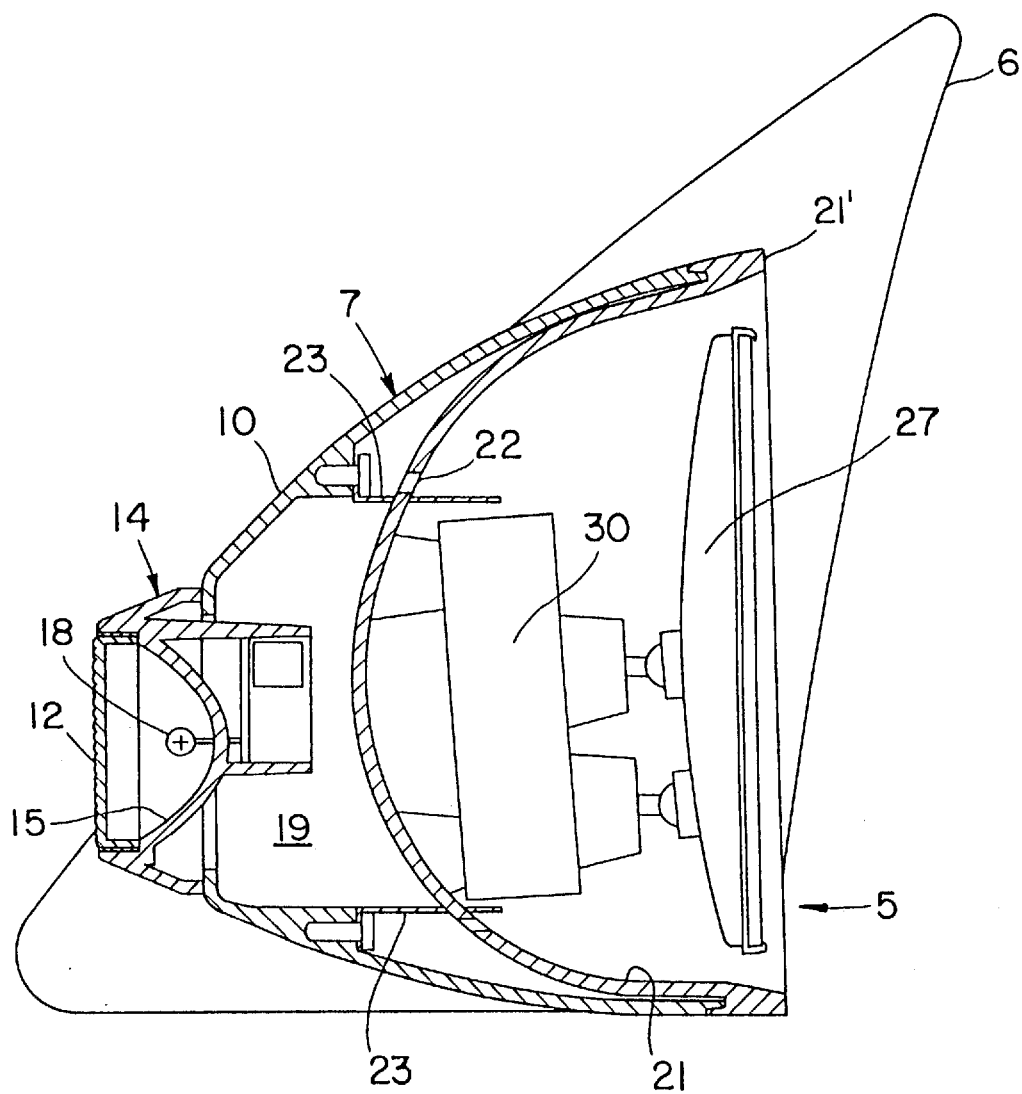
FIG. 3 is an enlarged sectional view, taken along line 3—3 of FIG. 2 of the apparatus of FIGS. 1 and 2.

In FIGS. 1 and 2, a warning light assembly In accordance with a preferred embodiment of the present invention is indicated generally at 7. Assembly 7 comprises a light head 14, with an associated housing 10, i.e., a warning light subassembly. The warning light subassembly is integrated with a rear-view mirror subassembly which is indicated generally at 5. Mirror subassembly 5 will customarily be fixedly mounted on a vehicle via a mirror support arm 6. Light head 14 may, for example, comprise a miniaturized version of the wide angle strobe light disclosed in U.S. Pat. No. 4,866,329. Head 14 is, in the disclosed embodiment, affixed to the leading end of housing 10, i.e., the end of the housing which faces in the direction of forward travel of the vehicle on which assembly 7 is mounted, by mounting screws 11. Housing 10 is generally convex and contoured to form an aerodynamically forward extension of the casing 21 (see FIG. 3) rear-view mirror subassembly 5. As best shown in FIG. 3, the trailing end of housing 10 smoothly merges with the periphery of mirror casing in the boundary region thereof which is adjacent the largest cross-sectional area of the casing, i.e., near the rearwardly facing edge 21' of the casing. Preferably, housing 10 has a texture and color which is generally consistent with the removable trim member, i.e., a cover or cap, of rear-view mirror subassembly 5 which housing 10 replaces. While FIG. 1 shows a single light head 14 mounted on the front side of housing 10, a plurality of light heads similar to light head 14 may be mounted on a single housing 10. Optionally, the reflector portion of light head 14 can be integrally formed with housing 10.

Referring to FIG. 3, light head 14 includes a reflector 15, a lens 12 and a light source 18. Also as shown in FIG. 3, housing 10 is concave and thus defines a space 19 into the light head projects. While light source 18 is preferably a linear flash tube, any type of light emitter known in the art and capable of generating light of sufficient intensity could be employed. It will be understood by those skilled in the art that the light pattern produced by head 14 will primarily be a function of the optical properties of reflector 15 and lens 12.

FIG. 3 also shows details of the rear-view mirror subassembly 5. Rear-view mirror subassembly 5 has a mirror 27 which is supported by a mirror adjusting mechanism 30 which, in turn, is fixedly mounted to a concave mirror casing 21. A decorative cap or cover (not shown), when the vehicle is manufactured, is customarily provided on the side of housing 21 which faces in the forward direction of travel of the vehicle on which the assembly 7 is mounted. This cap will be color coordinated with the vehicle body and will be snapped into place and retained by spring-type plastic arms which engage apertures 22 in casing 21. Accordingly, the cap is removable. The housing 10 is designed to also snap in place, as a direct replacement for the cap, and is thus provided with leaf spring latches 23, two of which are shown, which have apertures for engaging sides of the apertures 22 in mirror casing 21.

A rear-view mirror subassembly 5 will typically be mounted on each side of a vehicle such that, when integrated therewith, the warning light assemblies 7 generally face in the forward direction and the rear-view mirrors 27 generally face rearwardly.

Figure 4:
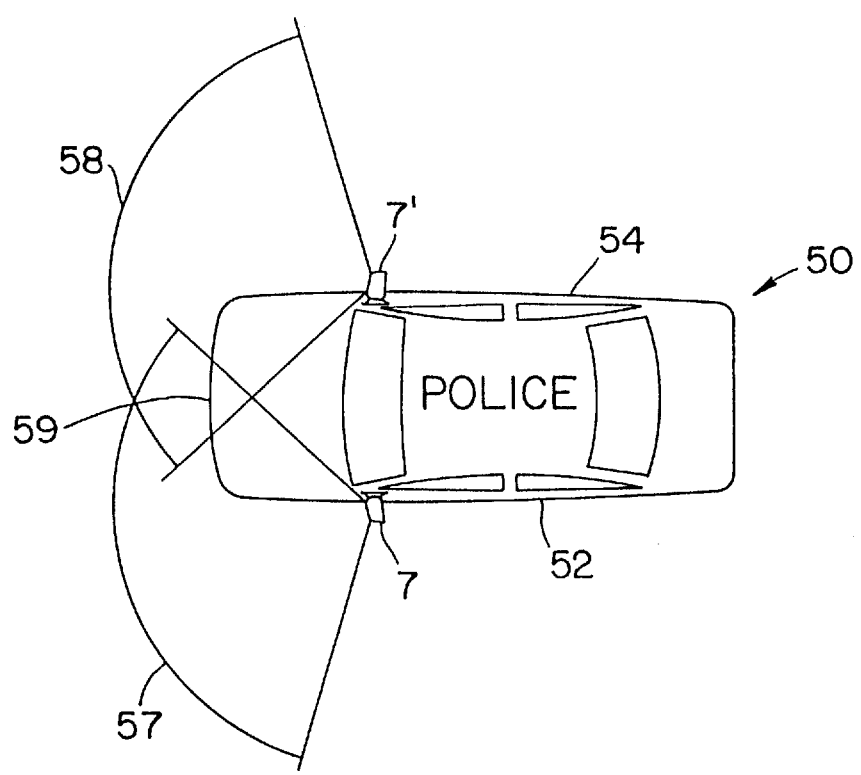
FIG. 4 is a representation of the light dispersion pattern created through use of a pair of the light assemblies of FIGS. 1–3.

FIG. 4 represents a light dispersion pattern which is typical of that provided by the disclosed embodiment of the present invention. As shown in FIG. 4, a vehicle, indicated generally at 50, has warning light assemblies 7 and 7' mounted on the opposite lateral vehicle sides 52, 54. The light head assemblies integrated with mirrors 5 and 5' generally face in the same direction as the front 59 of vehicle 50. The angle of divergence of the light beams provided by the light heads 14 of warning light assemblies 7 and 7' will be the same and will be selected, by adjusting the configuration of the lens and reflector of each head, so that the light head of assembly 7 produces such modifications which fall within the scope and spirit of the invention and are not limited to the embodiment expressly described above.

What is claimed is:

1. A method of signalling the presence of an emergency vehicle, the vehicle having a forwardly facing front end which defines a plane and oppositely disposed lateral sides which extend rearwardly from said front end, said method comprising the steps of:

integrating a high intensity, wide-angle warning light with each one of a pair of non-adjustable position rear-view mirror assemblies, each of the warning lights including a reflector, the rear-view mirror assemblies each having a peripheral region which extends about a rearwardly facing opening thereof, each of the rear-view mirror assemblies further having a mirror which is viewed through the rearwardly facing opening of the rear-view mirror assembly, each of said steps of integration including:

providing a support for a warning light, the support defining a housing having an access opening at a first end thereof and an oppositely disposed second end;

engaging the second end of the support with the peripheral region of one of the rear-view mirror assemblies, the warning light support being smoothly tapered from the first end thereof to the second end thereof to thereby define an aerodynamic three-dimensional shape having a minimum cross-sectional area at the first end, the support projecting forwardly from the peripheral region of the mirror assembly toward said plane and terminating at the first end of the support whereby the support forms an aerodynamically shaped extension of the engaged mirror assembly; and affixing the warning light to the first end of the support, the step of affixing including partially recessing the warning light reflector in the housing defined by the support by extending the reflector through the access opening at the first end of the support defined housing, the step of affixing positioning the warning light such that the reflector faces generally in the direction of said plane;

mounting one of the integrated mirror assemblies and warning lights on each of the lateral sides of the vehicle; and causing the warning lights to periodically provide pulses of high intensity light.

2. A method of signalling the presence of an emergency vehicle, the vehicle having a forwardly facing front end which defines a plane and oppositely disposed lateral sides which extend rearwardly from said front end, said method comprising the steps of:

integrating a high intensity, wide-angle warning light with each one of a pair of non-adjustable position rear-view mirror assemblies, the warning lights each including a reflector, a lens and a light source, the rear-view mirror assemblies each having a peripheral region which extends about a rearwardly facing opening thereof, each of the rear-view mirror assemblies further having a mirror which is viewed through the rearwardly facing opening of the rear-view mirror assembly, each of said steps of integration including:

selecting the reflector, lens and light source of the warning light to provide a light dispersion pattern having a horizontal angle which exceeds 90°;

providing a support for the warning light, the support defining a housing having an access opening at a first end thereof and an oppositely disposed second end;

engaging the second end of the support with the peripheral region of one of the rear-view mirror assemblies, the warning light support being smoothly tapered from the first end thereof to the second end thereof to thereby define an aerodynamic three-dimensional shape having a minimum cross-sectional area at the first end, the support projecting forwardly from the peripheral region of the mirror assembly toward said plane and terminating at the first end of the support whereby the support forms an aerodynamically shaped extension of the engaged mirror assembly; and affixing the warning light to the first end of the support;

mounting one of the integrated mirror assemblies and warning lights on each of the lateral sides of the vehicle; and causing the warning lights to periodically provide pulses of high intensity light.

3. A method of signalling the presence of an emergency vehicle, the vehicle having a forwardly facing front end which defines a plane and oppositely disposed lateral sides which extend rearwardly from said front end, said method comprising the steps of:

integrating a high intensity, wide-angle warning light with each one of a pair of non-adjustable position rear-view mirror assemblies, the warning lights each including a reflector, a lens and a light source, the mirror assemblies each having a peripheral region which extends about a rearwardly facing opening thereof, each of the rear-view mirror assemblies further having a mirror which is viewed through the rearwardly facing opening of the rear-view mirror assembly, each of said steps of integrating including:

selecting the reflector, lens and light source of the warning light to provide a light dispersion pattern having a horizontal angle which exceeds 90°;

providing a support for the warning light, the support defining a housing having an access opening at a first end thereof and an oppositely disposed second end;

engaging the second end of the support with the peripheral region of one of the rear-view mirror assemblies, the warning light support being smoothly tapered from the first end thereof to the second end thereof to thereby define an aerodynamic three-dimensional shape having a minimum cross-sectional area at the first end, the support projecting forwardly from the peripheral region of the mirror assembly toward said plane and terminating at the first end of the support whereby the support forms an aerodynamically shaped extension of the engaged mirror assembly;

affixing the warning light to the first end of the support in registration with the access opening at the first end of the support defined housing, the step of affixing including extending the reflector of the warning light through the access opening to thereby partially recess the reflector in the housing, the step of affixing further including positioning the warning light such that the reflector faces generally in the direction of said plane; mounting one of the integrated mirror assemblies and warning lights on each of the lateral sides of the vehicles; and causing the warning lights to periodically provide pulses of high intensity light.

* * * * *